Sept. 25, 1951 A. J. HENQUET ET AL 2,568,733

ELIMINATION OF TRICORDS IN TOLL EXCHANGES

Filed May 23, 1947 2 Sheets-Sheet 1

INVENTORS
ANDRE JEAN HENQUET
MARCEL ROGER MAUGE
BY Robert Harding Jr.
ATTORNEY

ELIMINATION OF TRICORDS IN TOLL EXCHANGES

Filed May 23, 1947 2 Sheets-Sheet 2

INVENTORS
ANDRE JEAN HENQUET
MARCEL ROGER MAUGE
BY Robert Harding Jr.
ATTORNEY

Patented Sept. 25, 1951 2,568,733

UNITED STATES PATENT OFFICE 2,568,733

ELIMINATION OF TRICORDS IN TOLL EXCHANGES

Andre Jean Henquet and Roger Marcel Mauge, Boulogne-Billancourt, France, assignors to International Standard Electric Corp., New York, N. Y., a corporation of Delaware Application May 23, 1947, Serial No. 750,124
In France September 22, 1943

Section 1, Public Law 690, August 8, 1946
Patent expires September 22, 1963

5 Claims. (Cl. 179—27)

This invention relates to new and useful improvements in the circuits disclosed in our copending application filed July 23, 1947, Serial No. 763,062, which will be set forth in detail with reference to the attached drawings, in which.

According to the invention a plurality of cord circuits are provided at an operator's position. These cords, by means of detachable connectors, serve as links between calling and called trunks terminating at the position. Also provided at the operator's position are a plurality of diversion or by-pass circuits each terminating in a pair of finders connected in multiple to the trunks. A diversion or by-pass circuit is employed whenever two first-class trunks are to be connected to one another and when connected to the two trunks by-passes the operator's position. By means of a diversion circuit additional equipment may be connected to the talking connection and a circuit is provided over which signals necessary for linking two first-class trunks may be transmitted.

In the embodiment shown, the first-class trunks are characterized by a third wire over which a positive potential is applied.

Figure 1:
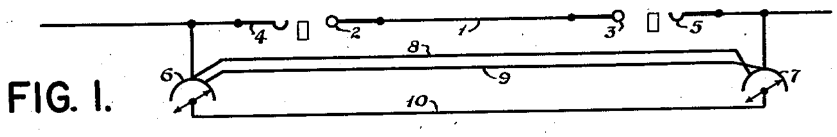
Fig. 1 shows the general scheme for establishing communication between two first-class trunks in exchanges employing features of the invention.

In Fig. 1, the general scheme for first-class trunk connections is shown to comprise a double cord 1 having connectors, such as plugs 2 and 3 and jacks 4 and 5 at an operator's position. Finders 6 and 7 are provided for finding calling and called first-class trunks. They are connected over circuits 8 and 9 so that either finder may connect the diversion circuit 10 irrespective of the calling or called condition of the trunk.

When it is desired to connect a first-class calling trunk to a first-class called trunk, alternating calling current is sent over wires 11 and 12 to operate relay 13, which is bridged across the line over back contacts of relay 14. When relay 13 operates, it extinguishes the free-line lamps 15 and 16, and by a front contact lights calling lamp 17.

Figure 2:
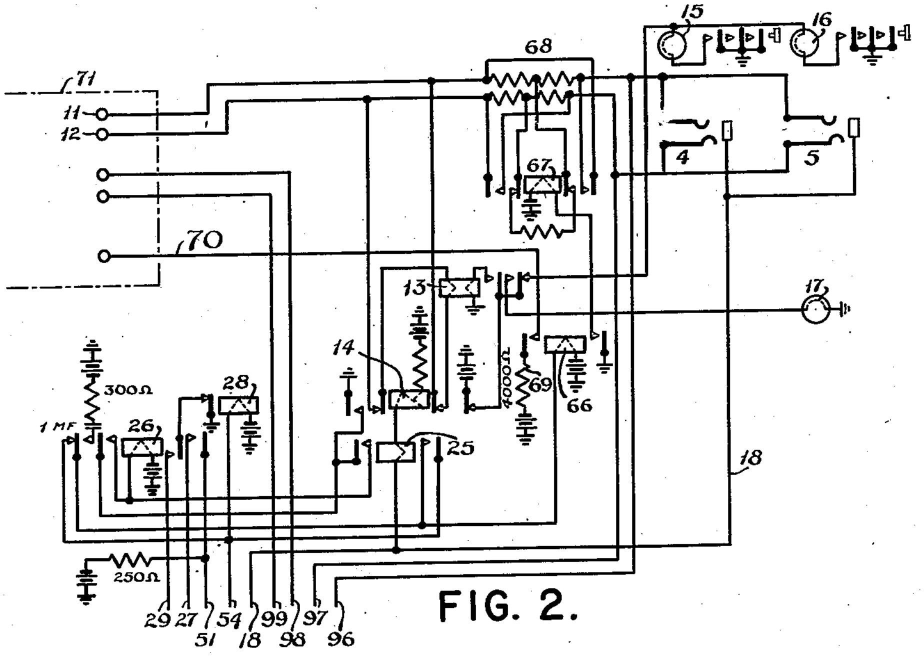
Fig. 2 shows the portion of a first-class trunk, incoming or outgoing, required for explaining the operation of toil exchanges incorporating features of the invention.
Figure 3:
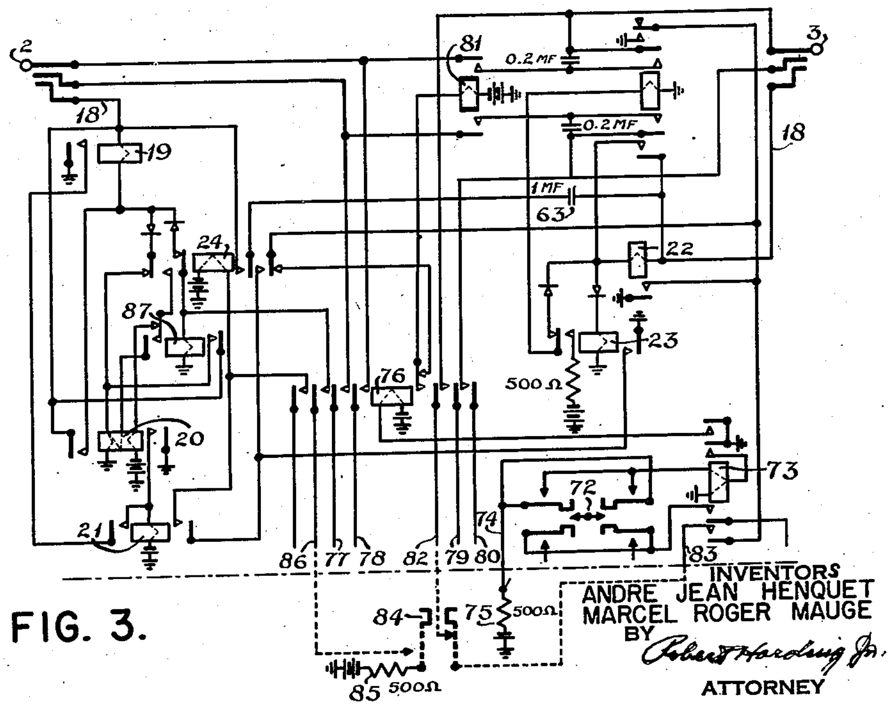
Fig. 3 shows a portion of the cord circuit useful in explaining the invention.
Figure 4:
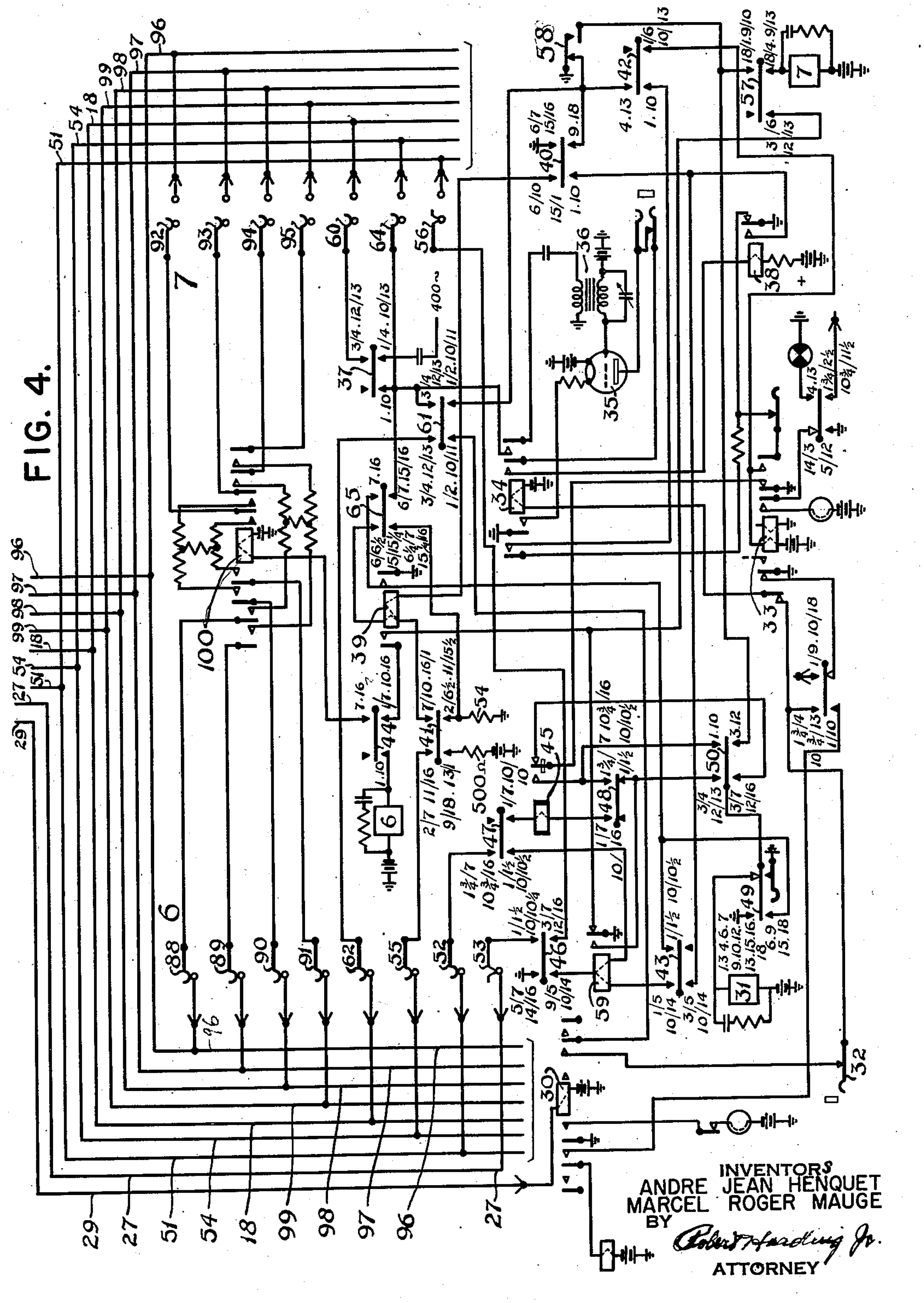
Fig. 4 shows an example of a four-wire connecting or diversion circuit to link first-class trunks to each other, according to the invention.

The operator plugs into jack 4 with plug 2, thereby connecting her cord circuit (Fig. 3). If the call is to a first-class trunk, identified like the calling trunk, by positive potential on wire 18, relays 19, 20, 21, 22 and 23 (Fig. 3) operate when the called trunk is plugged in. Relay 24 is operated over the front contacts of relays 23 and 21 and connects relay 20 to the negative battery instead of to ground. This substitution causes the pulling-up of relay 25 of the calling trunk (Fig. 2), which operates only on the strong current obtained when the positive and negative batteries are in series. The front left contact of relay 25 operates relay 26, which locks, applies a test potential over wire 27 and, over the back contact of relay 28, connects ground to wire 29. Relay 26 operates starting relay 30 over wire 29 of the diversion circuit (Fig. 4), which then closes a circuit for all the free diversion circuits, i. e. all those whose sequence switch 31 is in position 1 or 10, whose jack 32 is closed and whose alarm relay 33 is de-energized. The front contact of relay 30 operates relay 34 (jack 32 and back contact of relay 33) which heats the cathode of tube 35. The primary of a grid transformer 36 of tube 35 is connected to a source of phonic current (400 cycles) over front contact of relay 34 and lower contacts of cam 37. Relay 38 in series in the tube plate, operates and actuates relay 39 (left-hand contacts cam 40, relay 39, upper right and lower left contacts cam 41, battery). If the tube does not operate, relay 38 remains at rest, and relay 33, which is slow operating, has time to operate: battery, relay 33, lower right and left contacts cam 42, front contact of relay 34, back contact of relay 38, ground.

The front contact of relay 39 applies ground to the high resistance winding of relay 59 (ground, upper right and left contacts cam 43, relay 59) and also operates finder magnet 6 over back contact of relay 59, front contact of relay 39 and lower right and left cam 44.

The wipers of finder 6 rotate and select the calling trunk. Relay 59 of the first diversion circuit finding the calling trunk (characterized by the potential applied to wire 27) operates (upper right and lower left cam 46, high resistance winding of relay 59, upper contacts of cam 43, front contact of relay 39 to ground), stops finder 6 and closes a circuit for its low resistance winding in series with relay 45 over cams 47 and 48. Relay 45 operates when the test is successfully completed and causes the sequence switch 31 to advance from 1 to 3 (battery, driving magnet 31, upper right cam 49, upper right cam 50, front contact relay 45, back contact relay 33, ground). As soon as position 1 is passed the finder 6 stops. Relay 38 falls back because tube 35 stops operating, the phonic current supply of the primary of its grid transformer is cut off at cam 37. After position 3/4, relay 34 is held independently of the starting relay over the back contact of relay 33. Besides, relay 45 is connected to wire 51 (upper left and lower right of cam 47) and to ground (upper contacts of cam 48, front contact relay 45). Wipers 52 and 53 are connected together over wires 27 and 51 and front contact of relay 26, whereby the test potential is reduced to prevent the operation of another relay 59.

In position 2, a ground across a 4,000-ohm resistance 54 (Fig. 4) is connected over lower right and upper left contacts of cam 41, wiper 55, wire 54, relay 28 to battery. The armature of relay 28 disconnects ground from wire 29 which de-energizes relay 30.

In position 3, relay 59 which is disconnected from wiper 53 in position 1½ (cam 46) is connected to wiper 56 of finder 7 over lower contacts of cam 46. The clutch magnet of finder 7 is connected to the back contact of relay 59 over the lower contacts of cam 57 and starts when finder 7 leaves its rest position, it causes sequence switch 31 to advance from 3 to 4 by applying ground from off-normal contact 58 through lower right-hand contact cam 50 and upper right-hand contact of cam 49. Finder 7 continues to hunt.

In position 4, the primary of transformer 36 is connected over front contact of relay 34, cam 61 to wiper 62 of finder 6 and thence over wire 18, sleeve of jack 4 and plug 2, relay 24 front, condenser 63, sleeve of plug 3 and jack 5 of the called trunk plugged in by the operator.

When finder 7 reaches the set of contacts corresponding to the first-class trunk plugged in by the operator, the source of phonic current is connected over wire 18 of this trunk and wiper 60 and thus to the primary winding of transformer 36. Tube 35 and then relay 38 again operate and connect a ground to relay 59 (front contact of relay 38, lower and upper left contacts cam 43, relay 59). If full potential is found by wiper 56, relay 59 operates, stops finder 7 and causes the sequence switch 31 to advance from position 4 to position 6.

It is to be noted that the relative positions of the trunks in the finder banks are immaterial and the calling trunk may be ahead of the called trunk. In this case, when finder 7 passes over the contacts of the calling trunk, relay 38 (Fig. 3) will operate, but relay 59 cannot operate because the potential found by wiper 56 on wire 51 is reduced by relay 45 connected to the wire 51 over 52 of finder 6.

It may likewise happen that finder 7 might test a circuit intended for seizure by another finder. Wrong connections are impossible because the two finders 7 start from the same normal position and the circuits are arranged in the same order in their banks.

In position 5 of the sequence switch, relay 59 falls off and ground is connected to wiper 56 of finder 7 over lower right and upper left contacts of cam 46 to guard the diversion circuit. In position 6 relay 39 is connected over its two windings in series to wiper 64 of finder 7 (wiper 64, lower right and upper left contacts cam 65, windings relay 39, upper contacts of cam 40, ground), whereby relays 28 and 66 (Fig. 2) of the called first-class trunk operate (battery, relay 28, and relay 66 in parallel, wiper 54, wiper 64, lower right and upper left contacts cam 65, relay 39, upper contacts of cam 40, ground). Relay 39, which is marginal, operates and advances the sequence switch from position 6 to position 7. The ground across the 4,000-ohm resistance 54 connected over the lower right and upper left of cam 41 and wiper 55 to wire 54 is replaced by the low resistance winding of relay 39, which is held in series with relay 66 (Fig. 2) of the calling first-class trunk.

A front contact of relay 66 (Fig. 2) operates relay 67, which eliminates attenuation coil 68, and another front contact of relay 66 connects a battery across 4,000-ohm resistance 69 to signaling wire 70, which changes terminal box 71 from four-wire to two-wire connection.

When the operator depresses listening key 72 (Fig. 3) relay 73 is connected by wire 74 to battery across a 500-ohm resistance 75. Relay 73 operates and causes relay 76 to operate. Front contacts of relay 76 connect in the operator's head set over wires 79, 80. Relay 81 operates over front contact of relay 76, wires 82, 83, front contact of relay 73 and front contact of relay 22, under the control of separation key at the operator's position.

If the key 84 is operated, relay 81 falls back and battery is connected across 500-ohm resistance 85, wire 86 and front contact of relay 76, to relay 87, which is thereby energized. Relay 87 disconnects the negative battery from wire 18; hence relay 25 of the calling trunk (Fig. 2) is released and relay 66 also releases thereby reintroducing coil 68 and four-wire terminal box 71.

The conversation, when going from left to right, takes place over wires 11, 12 (Fig. 2), front contact of relay 67, wires 96, 97 (Fig. 4), wipers 88, 89 of finder 6, front contacts relay 100 and wipers 94 and 95 of finders 7; when going from right to left, then over wipers 92, 93 front contacts of relay 100, wipers 90, 91 and wires 98, 99. Relay 100 is energized in positions 7 and 16 of the sequence switch from ground at relay 59, front contact relay 39, right contacts of cam 44.

When the operator pulls out plug 2, all the elements return to their normal position and when relay 45 falls off the sequence switch 31 moves out of position 7 to 10 (or to 1), where it makes the circuit available for a new call. The sequence switch stops in position 9 in which finder magnet 7 is energized over right-hand contacts of cam 57 and off-normal contact 58. The finder 7 returns to normal, whereupon relay 39 is again energized (over contact 58, lower right and upper left of cam 40, winding of relay 39, upper right and lower left of cam 41). Relay 39 closes a circuit over cam 49 lower left which moves the sequence switch from 9 into 10, whereupon 39 energizes.

Although the invention has been described as applied to a particular embodiment, it is in no way restricted thereto and is capable of numerous modifications and adaptations without departing from the scope of the claims.

What is claimed is:

1. In a telephone exchange system, a plurality of operator's cord circuits at an operator's position, a plurality of calling and called trunks terminating at said position, means for establishing a connection from any calling trunk to any called trunk over a cord, a plurality of by-pass circuits for said cord circuits, finders connected to each by-pass circuit, said finders being connected in multiple to all said calling and called trunks respectively, a sequence switch for each by-pass circuit, a test relay for each by-pass circuit, a start relay adapted to be operated when a cord interconnects certain trunks thereby moving finders associated with said trunks, circuits energized upon operation of said start relay for starting and stopping the sequence switch until the finders in conjunction with the test relay have found the calling and called trunks, and a talking circuit established between the calling and called trunks via an established by-pass circuit and its associated finders.

2. In a telephone exchange system, a plurality of operator's cord circuits at an operator's position, a plurality of trunks terminating in calling and called jacks, operator's cords to establish a connection by means of a cord from any calling trunk jack to any called trunk jack, a plurality of by-pass circuits each terminating in a pair of finders for said cord circuits, the finder pair of each by-pass circuit having terminal banks connected in multiple to all said calling and called trunks respectively, a sequence switch for each by-pass circuit having two normal positions and a plurality of operating positions, a test relay for each by-pass circuit, a start relay common to all said by-pass circuits adapted to be operated when a cord interconnects certain trunks for starting the first finder of each pair of finders of all by-pass circuits whose sequence switch is in either one of its two normal positions, an operating circuit for each test relay, the test relay circuit of a particular by-pass circuit being closed upon the first finder thereof finding the terminals of the calling trunk in said connection, said circuit including the last mentioned first finder, circuits controlled by the test relay for starting and stopping the sequence switch, thereby controlling the hunting of the finders as the trunks are tested, an energizing circuit closed for the test relay over the second finder when said second finder finds the terminals of the called trunk of said connection, means operative upon the last mentioned energization of the test relay for moving the sequence switch into the next operating position in which the last mentioned finder is stopped, and a talking connection between the calling and called trunks in said connection via an established by-pass circuit and its associated pair of finders.

3. In a telephone exchange system, a plurality of operator's cord circuits at an operator's position, a plurality of calling and called trunks terminating at said position, detachable connectors at the operator's position for establishing a connection by means of a cord from any calling trunk to any called trunk, a plurality of by-pass circuits each terminating in a pair of finders for said cord circuits, the finder pair of each by-pass circuit having terminal banks connected in multiple to all said calling and called trunks respectively, a sequence switch for each by-pass circuit having two normal positions and a plurality of operating positions, a test relay for each by-pass circuit, a start relay common to all said by-pass circuits adapted to be operated when a cord interconnects certain trunks and adapted to start the first finder of each pair of all by-pass circuits whose sequence switch is in either one of its two normal positions, an operating circuit for each test relay the test relay operating circuit of a particular by-pass circuit being closed upon the first finder thereof finding the terminals of the calling trunk in said connection, a circuit controlled by said test relay for causing the associated sequence switch to move out of the normal position occupied by it, means operative upon the sequence switch moving out of its normal position for first stopping the associated first finder, disconnecting the test relay therefrom and stopping the hunting first finders of all other by-pass circuits, a circuit closed in the next operating position of the sequence switch for starting the second finder of the associated particular by-pass circuit and for connecting the associated test relay thereto an energizing circuit closed for the test relay over the last mentioned finder upon it finding the terminals of the called trunk of said connection, means operative upon the second energization of the test relay adapted to move the sequence switch into the next operating position in which the last mentioned finder is stopped, a talking connection between the calling and called trunks in said connection via the particular by-pass circuit and its associated pair of finders, and means operative upon the termination of the conversation for returning all the elements of the system to normal.

4. In a telephone exchange system, a plurality of operator's cord circuits at an operator's position, a plurality of trunks terminating in calling and called jacks, operator's cords to establish connections from any calling trunk jack to any called trunk jack, a plurality of by-pass circuits each terminating in a pair of finders for said cord circuits, the finder pair of each by-pass circuit having terminal banks connected in multiple to all said calling and called trunks respectively, a sequence switch for each by-pass circuit, each sequence switch having two normal positions and a plurality of operating positions, a test relay for each by-pass circuit, a start relay common to all said by-pass circuits and adapted to be operated when a cord interconnects certain trunks, said start relay when operated being adapted to start the first finder of each pair of all by-pass circuits whose sequence switch is in either one of its two normal positions, an operating circuit for each test relay, the test relay operating circuit of a particular by-pass circuit being closed upon the first finder thereof finding the terminals of the calling trunk in said connection, said circuit including the last mentioned first finder, a circuit controlled by said test relay for causing the associated sequence switch to move out of the normal position occupied by it, means operative upon the sequence switch moving out of its normal position for stopping the associated first finder, disconnecting the test relay therefrom and then stopping the hunting first finders of all other by-pass circuits, a circuit closed in the next operating positions of the sequence switch for starting the second finder of the associated particular by-pass circuit and for connecting the associated test relay thereto, an energizing circuit closed for the test relay over the last mentioned finder upon it finding the terminals of the called trunk of said connection, means operative upon the second energization of the test relay for causing the sequence switch to move into the next operating position in which the last-mentioned finder is stopped, and a talking connection established between the calling and called trunks in said connection via the particular by-pass circuit and its pair of associated finders, means operative upon the termination of the conversation for moving the sequence switch of the particular by-pass circuit into the next operating position, and means operated upon said sequence switch being in said next operating position and adapted to move the second finder engaged in the connection and the sequence switch of the particular by-pass circuit to normal positions.

5. In a telephone exchange system, a plurality of operator's cord circuits at an operator's position, a plurality of trunks terminating in calling and called jacks, operators' cords to establish connections from any calling trunk jack to any called trunk jack, a plurality of by-pass circuits each terminating in a pair of finders for said cord circuits, the finder pair of each by-pass circuit having terminal banks connected in multiple to all said calling and called trunks respectively, a sequence switch for each by-pass circuit having two normal positions and a plurality of operating positions, a test relay for each by-pass circuit, a start relay common to all said by-pass circuits and adapted to be operated when a cord interconnects certain trunks, said start relay in operated condition being adapted to start the first finder of each pair of all by-pass circuits whose sequence switch is in either one of its two normal positions, an operating circuit for each test relay, the test relay operating circuit of a particular by-pass circuit being closed upon the first finder thereof finding the terminals of the calling trunk in said connection, said circuit including the last mentioned first finder, a circuit controlled by said test relay for causing the associated sequence switch to move out of the normal position occupied by it, means operative upon the sequence switch having moved out of its normal position for stopping the associated first finder, disconnecting the test relay therefrom and stopping the hunting first finders of all other by-pass circuits, a circuit closed in the next operating position of the sequence switch and adapted to start the second finder of the particular by-pass circuit and to connect the associated test relay to said last named second finder, an energizing circuit for the test relay closed over the last mentioned finder when it finds the terminals of the called trunk of said connection, means operative upon the second energization of the test relay for moving the sequence switch into the next operating position in which the last mentioned finder is stopped, a talking connection established between the calling and called trunks in said connection via the particular by-pass circuit and its pair of finders, means operative upon the termination of the conversation for moving the sequence switch of the particular by-pass circuit into the next operating position, a circuit adapted to be closed upon said sequence switch being in said next operating position for operating the second finder of the particular by-pass circuit engaged in the connection and returning it to normal, and a relay operated thereupon and adapted to move the associated sequence switch into its next normal position.

ANDRE JEAN HENQUET.
ROGER MARCEL MAUGE.

No references cited.